United States Patent [19]
Van Vlasselaer et al.

[11] Patent Number: 6,015,843
[45] Date of Patent: Jan. 18, 2000

[54] PROCESS FOR MAKING SILANIZED COLLOIDAL SILICA

[75] Inventors: Peter Van Vlasselaer; Shirin W. Hasan, both of Sunnyvale, Calif.

[73] Assignee: Dendreon Corporation, Seattle, Wash.

[21] Appl. No.: 09/006,775

[22] Filed: Jan. 14, 1998

[51] Int. Cl.[7] .................................. C08J 3/28; C08J 3/24; C08K 9/06

[52] U.S. Cl. ............................. 522/84; 522/85; 524/837; 524/838; 252/313.2; 252/314; 252/315.2; 252/315.6; 435/2

[58] Field of Search .............................. 252/313.2, 311, 252/314, 315.6; 106/35, 876, 287.1, 287.11, 287.13, 287.15; 522/77, 84, 85; 524/837, 838; 528/32, 38, 39, 40, 41; 435/2

[56] References Cited

U.S. PATENT DOCUMENTS

| | | |
|---|---|---|
| 4,027,073 | 5/1977 | Clark . |
| 4,177,315 | 12/1979 | Ubersax . |
| 4,188,451 | 2/1980 | Humphrey, Jr. . |
| 4,474,704 | 10/1984 | Sawicki . |
| 4,555,545 | 11/1985 | Kimura et al. . |
| 4,644,077 | 2/1987 | Gupta . |
| 4,747,987 | 5/1988 | Brauer et al. . |
| 4,822,828 | 4/1989 | Swofford . |
| 4,927,749 | 5/1990 | Dorn . |
| 4,927,750 | 5/1990 | Dorn . |
| 5,137,573 | 8/1992 | Daimon et al. . |
| 5,254,621 | 10/1993 | Inoue et al. . |
| 5,378,574 | 1/1995 | Winnik et al. . |
| 5,385,955 | 1/1995 | Tarshiani et al. . |

*Primary Examiner*—Susan W. Berman
*Attorney, Agent, or Firm*—Carol A. Stratford; Peter J. Dehlinger; Dehlinger & Associates

[57] ABSTRACT

A method of preparing an aqueous suspension of organosilanized colloidal silica particles is disclosed. Such particles are used in a variety of applications including density gradient separation media, anti-abrasion coatings and toner materials. The disclosed process is environmentally safe and produces a product that is aqueous and non-toxic to most biological cells.

10 Claims, 5 Drawing Sheets

PROCESS FOR MAKING SILANIZED COLLOIDAL SILICA

FIELD OF THE INVENTION

The invention relates to a process for producing a silanized colloidal silica preparation that is useful, for example, as a density gradient medium for separation of cells.

BACKGROUND OF THE INVENTION

Silanized colloidal silica preparations are used in a variety of industrial applications including, for example, production of abrasion resistant coatings, xerographic toner materials, and density gradient separation of biological materials.

Preparation of silanized colloidal silica can be difficult, since colloidal silica is inherently unstable under conditions which are optimal, if not necessary, for silanization, e.g., acidic pH. Under such acidic conditions, the silica often "gels", or loses its suspended properties to form a semi-solid jelly-like material. Under more neutral or alkaline pH conditions, the silanization does not proceed efficiently, possibly due to self-condensation of the silane. While for some applications (e.g., anti-abrasion coatings) it is not critical to retain the silica particles in a suspended state, for other applications (e.g., density gradient materials), it is important to retain the colloidal properties of the suspension.

Various methods have been devised to circumvent the recognized problems of silanization. According to one method, silanization is carried out in the presence of organic solvents in the absence of water; however, such organic solvents are difficult to remove from the preparation, and are not desirable in many applications, such as in density gradient materials, since they may be toxic or otherwise deleterious to the application.

Another known method for silanizing silica particles uses a catalyst. Again, this has the problem of adding unwanted, potentially toxic materials to the preparation. Moreover, addition of organic solvents and/or catalysts to the preparation potentially create higher levels of toxic waste, which must be disposed of in increasingly limited areas of the country. Therefore, it would be useful to have available alternate production methods that utilize water-soluble, environmentally safe reagents and intermediates.

U.S. Pat. No. 4,927,750 describes a method of preparing an organosilanized colloidal silica that is relatively non-toxic to cells; however, the method of preparation includes adding silane to the colloidal silica in a "dropwise" or gradual manner over a period of hours, while the mixture is held at a relatively high temperature (75° C.). This method is time-consuming and does not readily lend itself to bulk manufacturing methods. While the method may be carried out under alkaline conditions, it is stressed that the addition of silane to the silica must be gradual. Moreover, slight deviations from the prescribed method may lead to gelling of the suspension, making it unusable for certain applications, as described above.

The present invention solves many of the problems inherent in preparations made using prior art methods, such as instability of preparations, presence of organic solvents and other toxic intermediates, and generation of toxic by-products and waste. That is, according to prior art methods, aqueous formulations could only be prepared by painstakingly slow mixing of the organosilane with the colloidal silica; otherwise, the suspension would precipitate. Alternatively, the preparation could be made using organic solvents; however, the use of such reagents is not desirable for colloidal silica compositions for certain uses, such as in preparation of biological materials. Nor is the use of such reagents particularly desirable from the standpoint of minimizing hazardous waste production.

The present invention therefore overcomes the problems inherent in prior art methods by providing a method for preparing organosilanized colloidal silica particles that allows silanization of the silica under aqueous conditions which can be easily scaled up for bulk manufacturing processes. The resulting silanized colloidal silica preparation is extremely stable and remains in the soluble phase, even after multiple cycles of autoclaving and/or gamma irradiation, as required for sterilization of the medium. The formulation is particularly well-suited for use with animal cell preparations, since it can be suspended in a physiological salt solution without gelling or precipitating. Further it is relatively non-toxic to such cells, as evidenced by the observation that it can be used to process human cells for transplantation without inducing adverse effects in recipient patients.

SUMMARY OF THE INVENTION

The invention is concerned with a novel, environmentally safe method for preparation of a stable organosilanized colloidal silica suspension under aqueous conditions. The method is particularly suited to bulk preparation of organosilanized colloidal silica particles.

It is the discovery of the invention that the primary reagents for making the organosilanized colloidal silica suspension can be mixed together in a fairly rapid manner, without resorting to the slow infusion or dropwise additions that are necessary in prior art methods. This is possible, when the pH of the organosilane reagent is adjusted to fall within a range of about 2–3, and the reagent is further heated to about 80 degrees C. for about 1 hour. To this treated organosilane is then added a colloidal silica suspension to form an organosilane-colloidal silica mixture having a final concentration of between about 5 and about 10% organosilane. The pH of the organosilane-colloidal silica mixture is adjusted to a pH greater than about 6.0, and in preferred embodiments, in the range of 6–7, or more specifically, pH 6.2–6.5. The suspension is then "cured" for a period of time effective to produce a stable colloidal suspension. According to preferred embodiments curing is accomplished, for example, by heating to at least about 80 degrees C. or by ultraviolet irradiation. Such a stable suspension is evidenced by lack of precipitate formation in the presence of physiological salt or acid.

In a preferred embodiment, the organosilane has the general formula: $(X)_3$—Si—$(CH_2)_3$—Y, where

Y is selected from the group consisting of

—$O_2CCH_3$, —$N(CH_2CH_2OH)_2$, —$CO_2CH_3$, —$NH(CH_2)_2NH(CH_2)_2CO_2CH_3$, $NHCOCH_2NHC(CH_3)O$, and According to this embodiment, X is selected from the group consisting of $H_3CO$, Cl, and $H_5C_2O$.

In yet another preferred embodiment, the organosilane is gamma-glycidoxypropyltrimethoxysilane.

In a further preferred embodiment, the pH range of the reaction is about 6.0 to about 7.0; and preferably in the range of 6.2 to 6.5.

Silica particles making up the colloidal silica suspension can be of any size range consistent with maintaining a colloidal suspension; preferred size ranges include about 3 to about 12 nm diameter, and even more preferably, about 7 to 12 nm diameter.

According to an important feature of the invention, the stability of the silica suspension is evidenced by resistance to repeated autoclaving and resistance to gamma-irradiation treatment, and to stability in the presence of physiological concentrations of salts, such as 0.9% sodium chloride (saline). The foregoing manufacturing process is also relatively non-toxic to the environment, since the reagents and components are aqueous. The resulting composition is also relatively non-toxic to cells suspended in the silanized colloidal silica.

These and other objects and features of the invention will become more fully apparent when the following detailed description of the invention is read in conjunction with the accompanying drawings.

DETAILED DESCRIPTION OF THE INVENTION

I. Definitions

"Colloidal silica" refers to an aqueous suspension of colloidal silica particles, usually formed by polymerization of monosilicic acid from $SiO_2$ dissolved in water.

"Organosilanized colloidal silica (OCS) particles" refers to a colloidal silica composition to which is covalently linked an organosilane coating. U.S. Pat. No. 4,927,749 is incorporated herein by reference in its entirety for its description of an organosilanized colloidal silica preparation.

The term "stable silanized colloidal silica suspension" as used herein refers to colloidal silica particles which have been organosilanized in accordance with the above, further characterized as having compositional stability with regard to pH, osmolality, and density for a period of several days or after one or more autoclaving events or exposure to gamma irradiation. A stable colloidal silica suspension is evidenced by lack of precipitation or "gelling" after such treatments. Such stable suspensions also remain stable in the presence of, or after addition of, physiological salt concentrations, such as 0.9% (wt/vol) sodium chloride, and are stable to addition of acid to produce a pH of about 5–6. In contrast, when physiological salt or sufficient acid is added to an unstable solution, gelling or precipitation occurs, evidenced by the previously clear suspension turning white or opaque.

The term "sol" as used herein refers to a liquid colloid, suspension, or mixture in which solid particles are stably dispersed in a liquid phase.

The term "gel" as used herein refers to a colloidal suspension of a liquid in a solid, forming a jelly-like material, into a more solid form than a sol.

The term "non-toxic" to cells means that a substance is capable of being placed in close contact with a suspension of biological cells for a period of at least 30 minutes without diminishing the number of viable cells by more than about 20%. Preferably, such viable cells are also functional, as assessed by an appropriate functional assay. Examples of methods of measuring cell toxicity and functionality are provided in Examples 3–5 herein.

II. Method of Preparing a Stable Silanized Colloidal Silica Suspension

As summarized above, prior art methods for forming silanized colloidal silica particles have utilized one of two major sets of reaction conditions: either (1) in an aqueous environment, the reaction is carried out at an acidic pH (about pH 5.5) where the silane is added to the aqueous colloidal silica "sol" in a dropwise fashion or as a very slow infusion, in order to prevent gelling of the sol, or (2) the reaction is carried out in an organic solvent. The reaction is "cured" or stabilized, in both general methods, during the chemical synthesis.

As discussed above, the use of organic solvents is generally considered undesirable in a number of applications, due to toxicity and toxic waste concerns. Particularly in the context of preparation of materials for density-based separation of biological fractions, inclusion of organic solvents generally leads to cell toxicity. The known methods for silanization of colloidal silica under aqueous conditions are generally cumbersome and too time-consuming for the types of high capacity needed for industrial production of the material; moreover, even using these methods, gelation of the product may occur.

The method that is the subject of the present invention eliminates the need for the tedious, slow (dropwise) addition of reagent, and produces a silanized product that is stable and is non-toxic to biological materials such as cells, as demonstrated in Section IV, below. Since the prior art suggests that organosilanized compositions are unstable under aqueous conditions, the method of the present invention provides a significant improvement by providing an environmentally-safe method for forming a stable, aqueous composition.

Figure 1:
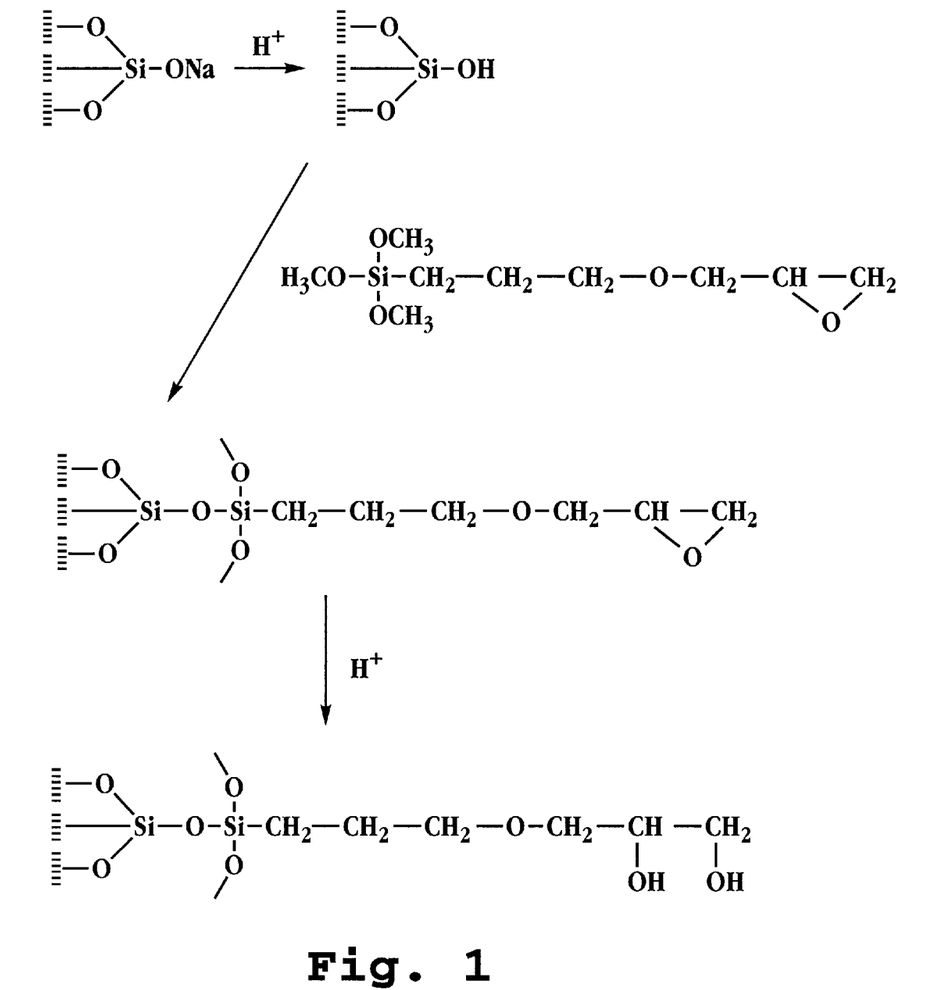
FIG. 1 shows the reaction sequence for silanization of silanol groups on the surface of a colloidal silica particle (Example 1)

Without committing to any particular theory, it is believed that the process of the invention results in initial siloxane bond formation between the silanol groups on the surface of the silica particle and the reactive moiety of the silane group, and that the bonding of the organosilane to the silica particle is further strengthened through a curing process that involves exposure of the reaction to relatively high reaction temperature (greater than about 80° C.) for a period of about one to several hours. This reaction is illustrated in FIG. 1, using the organosilane γ-glycidoxypropyltrimethoxysilane as an example.

Example 1 provides details of the method of the invention as it can be performed using γ-glycidoxypropyltrimethoxysilane (GPMS) as a silanizing agent. It is understood that this method can be readily adapted to any or all of the organosilanes having sufficient reactivity to form siloxane bonds in solution. Table 1 provides a list of exemplary organosilanes that can be used to form compositions of the invention. While the method of the invention is exemplified using GPMS as organosilane reagent, it is understood that reaction times and optimization of conditions will depend upon the particular reagent selected; it is within the skill of the practitioner to determine such optimized conditions.

Example 1 exemplifies the use of GPMS for organosilanizing colloidal silica particles suitable for preparation of a biological separation medium. Here, GPMS is first added to water to form a solution having a final concentration of about 10%. According to an important feature of the invention, this solution is made acidic (pH approximately 2.5) by addition of acid and is then heated to 80° C. for 60 minutes. The solution is then cooled to room temperature. Colloidal silica is added to the aqueous silane solution while stirring continuously until the total concentration of silane is in the range of 5–10%, and preferably about 6–8% vol/vol. The pH of the silane silica mixture is adjusted to 6.2 to 6.5, and the solution is stirred at room temperature for about 15–30 minutes.

The silane used for the foregoing preparative steps may be any of a number of silane compounds. The critical feature of silane selection is that the compound is soluble under aqueous conditions. Accordingly, in addition to GPMS, appropriate organosilanes include, but are not limited to those listed in U.S. Pat. No. 4,927,749 (DORN), incorporated herein by reference. Table 1 provides examples of various silanes that can be used in the present invention; however, the invention is not to be limited by the recitation of Table 1.

TABLE 1

Organosilances Which Can Be Used to Prepare Reagent-Modified Colloidal Silica

| Parent Organosilane | Where X = |
|---|---|
| (a) | |
| $(X)_3$—$Si(CH_2)_3$—O—$CH_2CHCH_2O$ (ring) | |
| (γ-glycidoxypropyl) trimethoxysilane | $H_3CO$ |
| (3-glycidoxypropyl) trichlorosilane | Cl |
| (3-glycidoxypropyl) triethoxysilane | $H_5C_2O$ |
| (3-glycidoxypropyl) triacetoxysilane | $H_3CCO_2$ |
| (3-glycidoxypropyl) methyl di- *X silane | $H_3C$ |
| (3-glycidoxypropyl) dimethyl *X silane | $(H_3C)_2$ |
| (b) | |
| $(X)_3$—$Si(CH_2)_2$—O—$CH_2CHCH_2O$ (ring) | |
| (2-glycidoxyethyl) trimethoxysilane | $H_3CO$ |
| (2-glycidoxyethyl) trichlorosilane | Cl |
| (2-glycidoxyethyl) triethoxysilane | $H_5C_2O$ |

TABLE 1-continued

Organosilances Which Can Be Used to Prepare Reagent-Modified Colloidal Silica

| Parent Organosilane | Where X = |
|---|---|
| (2-glycidoxyethyl) triacetoxysilane | $H_3CCO_2$ |
| (2-glycidoxyethyl) methyl di- *X silane | $H_3C$ |
| (3-glycidoxypropyl) dimethyl *X silane | $(H_3C)_2$ |
| (c) $(X)_3$—$Si(CH_2)_3$—$O_2CCH_3$ | |
| 3-acetoxypropyl trimethoxysilane | $H_3CO$ |
| 3-acetoxypropyl trichlorosilane | Cl |
| 3-acetoxypropyl triethoxysilane | $H_5C_2O$ |
| 3-acetoxypropyl triacetoxysilane | $H_3CCO_2$ |
| 3-acetoxypropylmethyldi- *X silane | $H_3C$ |
| 3-acetoxypropyldimethyl *X silane | $(H_3C)_2$ |
| (d) $(X)_3$—$Si(CH_2)_2$—$O_2CCH_3$ | |
| 2-acetoxyethyl trimethoxysilane | $H_3CO$ |
| 2-acetoxyethyl trichlorosilane | Cl |
| 2-acetoxyethyl triethoxysilane | $H_5C_2O$ |
| 2-acetoxyethyl triacetoxysilane | $H_3CCO_2$ |
| 2-acetoxyethylmethyldi- *X silane | $H_3C$ |
| 2-acetoxyethyldimethyl *X silane | $(H_3C)$ |
| (e) $(X)_3$—$Si(CH_2)_3$—$N(CH_2CH_2OH)_2$ | |
| Bis (2-hydroxyethyl)-3 amino propyl-trimethoxysilane | $H_3CO$ |
| Bis (2-hydroxyethyl)-3 amino propyl-trichlorosilane | Cl |
| Bis (2-hydroxyethyl)-3 amino propyl-triethyoxysilane | $H_5C_2O$ |
| Bis (2-hydroxyethyl)-3 amino propyl-triacetoxysilane | $H_3CCO_2$ |
| Bis (2-hydroxyethyl)-3 amino propyl-methyldi- *X silane | $H_3C$ |
| Bis (2-hydroxyethyl)-3 amino propyl-dimethyl *silane | $(H_3C)_2$ |
| (f) $(X)_3$—$Si(CH_2)_2$—$N(CH_2CH_2OH)_2$ | |
| Bis (2-hydroxyethyl)-2 amino ethyl-trimethoxysilane | $H_3CO$ |
| Bis (2-hydroxyethyl)-2 amino ethyl-trichlorosilane | Cl |
| Bis (2-hydroxyethyl)-2 amino ethyl-triethyoxysilane | $H_5C_2O$ |
| Bis (2-hydroxyethyl)-2 amino ethyl-triacetoxysilane | $H_3CCO_2$ |
| Bis (2-hydroxyethyl)-2 amino ethyl-methyldi- *X silane | $H_3C$ |
| Bis(2-hydroxyethyl)-2 amino ethyl-dimethyl *silane | $(H_3C)_2$ |
| (g) $(X)_3$—$Si(CH_2)_3$—$CO_2CH_3$ | |
| 3-(carbomethoxy) propyltrimethoxysilane | $H_3CO$ |
| 3-(carbomethoxy) propyltrichlorosilane | Cl |
| 3-(carbomethoxy) propyltriethyoxysilane | $H_5C_2O$ |
| 3-(carbomethoxy) propyltriacetoxysilane | $H_3CCO_2$ |
| 3-(carbomethoxy) propyl methyl-di- *X silane | $H_3C$ |
| 3-(carbomethoxy) propyl dimethyl- *X silane | $(H_3C)_2$ |
| (h) $(X)_3$—$Si(CH_2)_2$—$CO_2CH_3$ | |
| 2-(carbomethoxy) ethyltrimethoxysilane | $H_3CO$ |
| 2-(carbomethoxy) ethyltrichlorosilane | Cl |
| 2-(carbomethoxy) ethyltriethyoxysilane | $H_5C_2O$ |
| 2-(carbomethoxy) ethyltriacetoxysilane | $H_3CCO_2$ |
| 2-(carbomethoxy) ethyl methyl-di- *X silane | $H_3C$ |
| 2-(carbomethoxy) ethyl dimethyl- *X silane | $(H_3C)_2$ |
| (i) $(X)_3$—$Si(CH_2)_3$—$NH(CH_2)_2NH(CH_2)_2CO_2CH_3$ | |
| Methyl (2-(3-trimethoxy silylpropyl-amino) ethylamino)-3-proprionate | $H_3CO$ |
| Methyl (2-(3-trichloro silylpropyl-amino)ethylamino)-3-proprionate | Cl |
| Methyl (2-(3-triethoxy silylpropyl-amino) ethylamino)-3-proprionate | $H_5C_2O$ |
| Methyl (2-(3-triacetoxy silylpropyl-amino) ethylamino)-3-proprionate | $H_3CCO_2$ |
| Methyl (2-(3-di- *X methylsilylpropyl- | $H_3C$ |

TABLE 1-continued

Organosilances Which Can Be Used to Prepare Reagent-Modified Colloidal Silica

| Parent Organosilane | Where X = |
|---|---|
| amino) ethylamino)-3-proprionate | |
| Methyl (2-(3- *X dimethylsilylpropyl- amino) ethylamino)-3-proprionate | $(H_3C)_2$ |
| (j) $(X)_3$—Si$(CH_2)_2$—NH$(CH_2)_2$NH$(CH_2)_2CO_2CH_3$ | |
| Methyl (2-(2-trimethoxy silylethyl- amino) ethylamino)-3-proprionate | $H_3CO$ |
| Methyl (2-(2-trichloro silylethyl- amino) ethylamino)-3-proprionate | Cl |
| Methyl (2-(2-triethoxy silylethyl- amino) ethylamino)-3-proprionate | $H_5C_2O$ |
| Methyl (2-(2-triacetoxy silylethyl- amino) ethylamino)-3-proprionate | $H_3CCO_3$ |
| Methyl (2-(2-di- *X methylsilylethyl- amino) ethylamino)-3-proprionate | $H_3C$ |
| Methyl (2-(2- *X dimethylsilylethyl- amino) ethylamino)-3-proprionate | $(H_3C)_2$ |
| (k) $(X)_3$—Si$(CH_2)_3$—NHCOCH$_2$NHC$(CH_3)$O | |
| N-(trimethoxysilylpropyl) acetylglycinamide | $H_3CO$ |
| N-(trichlorosilylpropyl) acetylglycinamide | Cl |
| N-(triethoxysilylpropyl) acetylglycinamide | $H_5C_2O$ |
| N-(triacetoxysilylpropyl) acetylglycinamide | $H_3CCO_2$ |
| N-(di- *X methylsilylpropyl) acetyl- glycinamide | $H_3C$ |
| N-(*X dimethylsilylpropyl) acetyl- glycinamide | $(H_3C)_2$ |
| (l) $(X)_3$—Si$(CH_2)_2$—NHCOCH$_2$NHC$(CH_3)$O | |
| N-(trimethoxyisilylethyl) acetylglycinamide | $H_3CO$ |
| N-(trichlorosilylethyl) acetylglycinamide | Cl |
| N-(triethoxysilylethyl) acetylglycinamide | $H_5C_2O$ |
| N-(triacetoxysilylethyl) acetylglycinamide | $H_3CCO_2$ |
| N-(di- *X methylsilylethyl) acetylglycinamide | $H_3C$ |
| N-(*X dimethylsilylethyl) acetylglycinamide | $(H_3C)_2$ |
| (m) $(X)_3$—Si$(CH_2)_3$—N—CH$_2$—CH$_2$—O—CH$_2$—CH$_2$ | |
| N-(3-trimethoxysilylpropyl) morpholine | $H_3CO$ |
| N-(3-trichlorosilylpropyl) morpholine | Cl |
| N-(3-triethoxysilylpropyl) morpholine | $H_5C_2O$ |
| N-(3-triacetoxylsilylpropyl) morpholine | $H_3CCO_2$ |
| N-(3-di- *X methylsilylpropyl) morpholine | $H_3C$ |
| N-(3- *X dimethylsilylpropyl) morpholine | $(H_3C)_2$ |
| (n) $(X)_3$—Si$(CH_2)_2$—N—CH$_2$—CH$_2$—O—CH$_2$—CH$_2$ | |
| N-(2-trimethoxysilylpropyl) morpholine | $H_3CO$ |
| N-(2-trichlorosilylpropyl) morpholine | Cl |
| N-(2-triethoxysilylpropyl) morpholine | $H_5C_2O$ |
| N-(2-triacetoxylsilylpropyl) morpholine | $H_3CCO_2$ |
| N-(2-di- *X methylsilylpropyl) morpholine | $H_3C$ |
| N-(2- *X dimethylsilylpropyl) morpholine | $(H_3C)_2$ |
| (o) $(X)_3$—Si$(CH_2)_3$—N—CH=CH—CH=CH | |
| N-(3-trimethoxysilylpropyl) pyrrole | $H_3CO$ |
| N-(3-trichlorosilylpropyl) pyrrole | Cl |
| N-(3-triethoxysilylpropyl) pyrrole | $H_5C_2O$ |
| N-(3-triacetoxysilylpropyl) pyrrole | $H_3CCO_2$ |
| N-(3-di- *X methylsilylpropyl) pyrrole | $H_3C$ |
| N-(3- *X dimethylsilylpropyl) pyrrole | $(H_3C)_2$ |
| (p) $(X)_3$—Si$(CH_2)_3$—N—CH=CH—CH=CH | |
| N-(2-trimethoxysilylethyl) pyrrole | $H_3CO$ |
| N-(2-trichlorosilylethyl) pyrrole | Cl |
| N-(2-triethoxysilylethyl) pyrrole | $H_5C_2O$ |
| N-(2-triacetoxysilylethyl) pyrrole | $H_3CCO_2$ |
| N-(2-di- *X methylsilylethyl) pyrrole | $H_3C$ |
| N-(2- *X dimethylsilylethyl) pyrrole | $(H_3C)_2$ |

Preferably, the method of the invention will use trialkoxysilanes having the formula $RSi(OR_1)_3$, where the group $R_1$ is an aliphatic or aryl organic radical typically of 1 to about 20 carbon atoms such as n-butyl, n-hexyl, n-heptyl, n-octyl, t-butyl, 3 butenyl, phenyl, or the like. These compounds, exemplified by GPMS herein are preferable due to their high reactivities, compared, for example, to dialkoxysilanes and monoalkoxysilanes, which may also be used. Exemplary trialkoxysilanes are listed in U.S. Pat. No. 4,644,077 (Gupta), incorporated herein by reference.

The colloidal silica starting material is preferably a colloidal silica particulate composition comprising an aqueous suspension of silica particles ranging in size from about 1 to about 5000 nm; for purposes of preparing a cell separation material, particles ranging in size from 3–22 nm, and particularly from 7–10 nm, are desirable. An exemplary starting material is "LUDOX HS-4011 made by DuPont, as described in Example 1, herein.

As mentioned above, without committing to an underlying mechanism of the invention, it is thought that the bond formation between the particles and the added silane reagent is strengthened, either by formation of more siloxane bonds, intramolecular bonds, or the like, by a subsequent "curing" process. Typically, such curing is effected by heat treatment; for example, by heating the suspension to 80° C. for 60 minutes, and subsequently to 95° C. for 3 h., as detailed in Example 1 herein. However, as an alternative or in addition, the curing may be effected by ultraviolet light treatment, for example, as described in U.S. Pat. No. 4,822,828, incorporated herein by reference. For example, in order to ensure completeness of the curing process, a heating regimen will be followed by exposure to ultraviolet light. Other suitable and equivalent curing processes will be apparent to those skilled in the art.

III. Stability of Silanized Particles

According to an important aspect of the present invention, the silanized particles prepared according to the claimed method of manufacture are particularly stable to high temperatures, such as are imposed by standard autoclave conditions (121° C., 2.1 Bar, 30 min.), as well as to ionizing irradiation, such as gamma irradiation providing a dosage of between about 2.5 and 4.0 megarads. Stability is typically measured by comparing such physical parameters as pH, osmolality and density of the preparation before and after treatment, as described below. Stability is also assessed by adding salt or acid to the suspension, to produce a physiological salt concentration (0.9% wt/vol sodium chloride) or a pH of about 5–6, respectively. When such additions are made, a stable suspension will not precipitate or "gel", while an unstable suspension turns white or opaque due to precipitation or gelling.

Figure 2A:
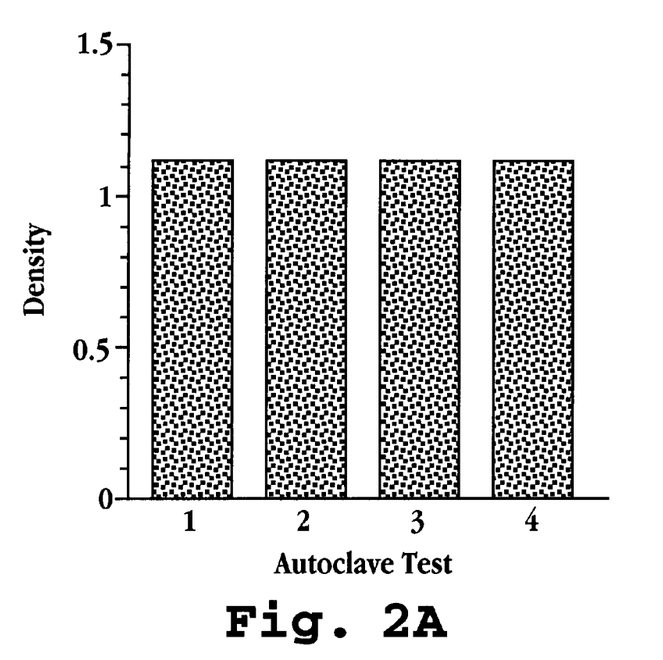
FIGS. 2A and 2B show the effect of repeated autoclaving on the measured density of colloidal silica prepared according to the method of the invention in the absence (2A) and presence (2B) of salts.
Figure 2B:
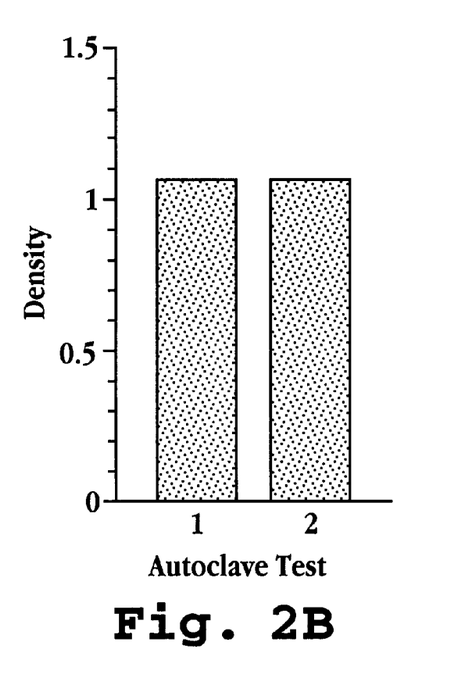
Figure 3A:
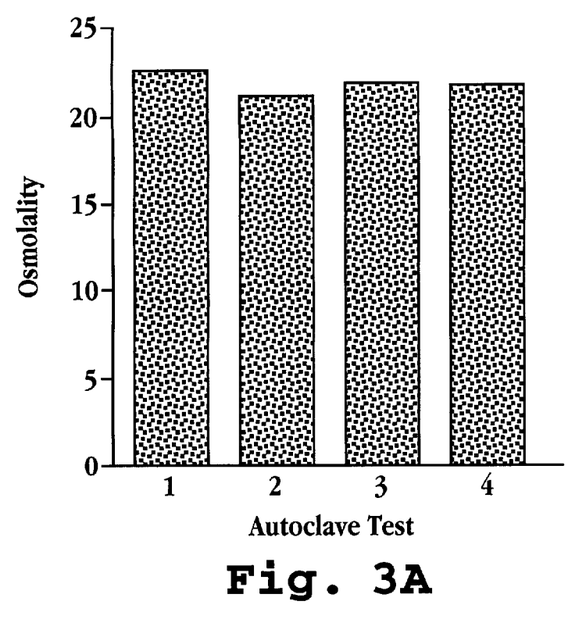
FIGS. 3A and 3B show the effect of repeated autoclaving on the measured osmolality of colloidal silica prepared according to the method of the invention in the absence (3A) and presence (3B) of salts.
Figure 3B:
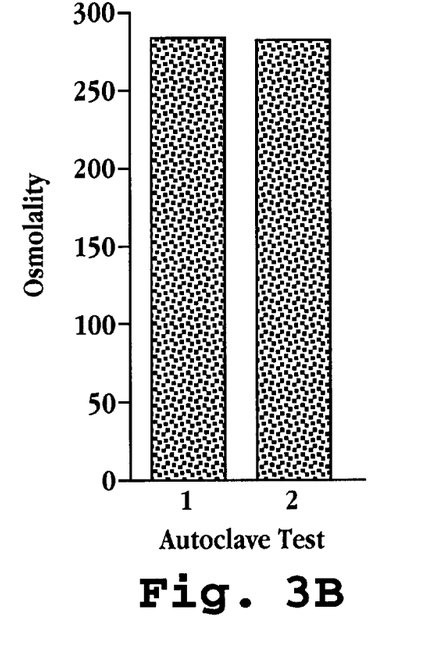
Figure 4A:
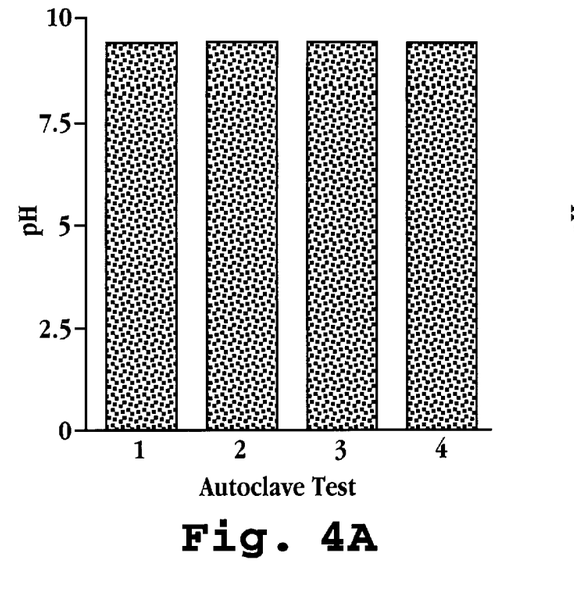
FIGS. 4A and 4B show the effect of repeated autoclaving on the measured pH of colloidal silica prepared according to the method of the invention in the absence (4A) and presence (4B) of salts.
Figure 4B:
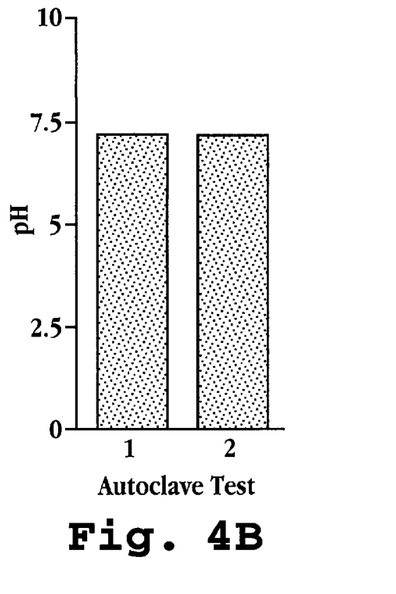

FIGS. 2A and 2B show the effect of repeated autoclaving (2–4 cycles, 121° C., 30 min. each) on the measured density of the organosilanized colloidal silica. As shown, in the absence or presence of physiological salts, the density of the suspension remained constant.

Likewise, the osmolality and pH of the suspension remained constant in the absence or presence of salts after 2–4 cycles of autoclaving (FIGS. 3A, 3B, 4A, 4B). In these experiments, the initial and final conditions of the suspension were as follows: density of 1.0605 g/ml, pH 7.4, osmolality 280 mOsm (+salts). Such physicochemical parameters are used to isolate certain types of useful cells, such as hematopoietic progenitor cells, lymphocytes, dendritic cells, mesenchymal cells and the like.

In further experiments carried out in support of the present invention, it has been found that silanized colloidal silica prepared in accordance with the method of the present invention is also stable to irradiation, particularly in the range of 2.5–4.0 megarad. This corresponds to a range of doses that are conventionally used for final sterilization of solutions, for example, for isolation of biological cells.

IV. Biological Compatibility of Silanized Colloidal Silica

Separation of cells by density gradient centrifugation is a popular technique in biotechnology. This method exploits the phenomenon that cells partition in a defined density medium according to their buoyant densities. Various density gradient materials are used for such separations, including colloidal silica-based media.

An example of a colloidal silica-based density medium commonly used in density gradient separation is "PERCOLL" (a registered trademark of Pharmacia Fine Chemicals, Piscataway, N.J.). PERCOLL is a stable suspension of colloidal silica particles having polyvinylpyrrolidone coatings. While PERCOLL is fairly stable at physiological pH, it is unstable to sterilization using heat or ionizing irradiation, under physiological conditions (e.g., when diluted in a physiological salt solution). These properties limit the usefulness of the product, especially in the context of clinical applications involving re-introduction of separated cells into humans or anywhere else that finally sterilized material is required.

U.S. Pat. No. 4,927,749 provides an organosilanized colloidal silica (OCS) particle (OCSP) preparation for density gradient separation that overcomes some of the problems discussed above. This medium has the advantage with respect to PERCOLL of being much less toxic to cells, particularly "rare" blood cells, such as hematopoietic progenitor cells, stem cells, antigen-specific lymphocytes, mesenchymal cells and the like, particularly after the medium is sterilized. However, as mentioned above, the method of preparation described in U.S. Pat. No. 4,927,749 includes a slow addition of silane to the preparation, which is impractical and expensive for bulk production methods.

It is the discovery of the present invention that a silanized colloidal silica particle preparation can be made using the method described above, and that this preparation is similarly non-toxic to biological preparations, particularly isolated blood cell fractions, as described below. In contrast, as discussed above, prior art products are frequently difficult to prepare, unstable to sterilization, and/or toxic to cells.

Figure 5:
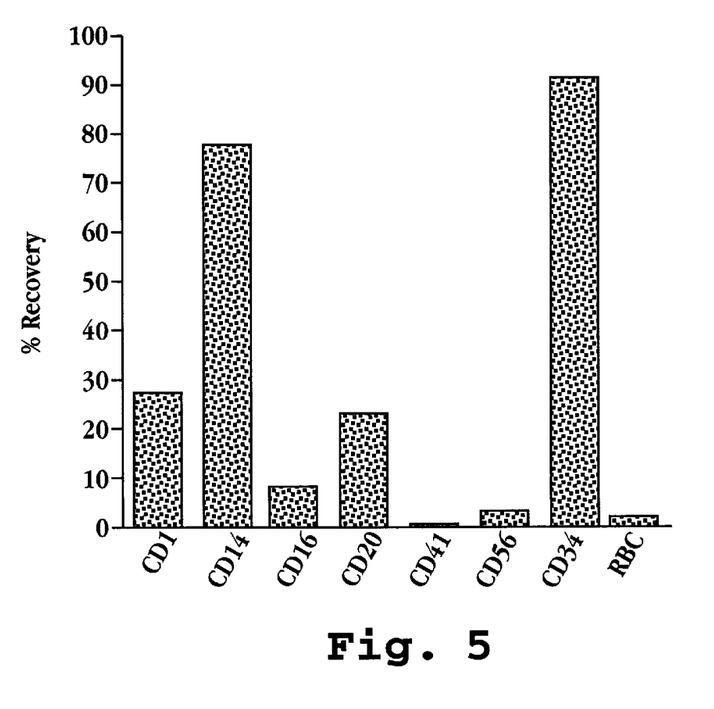
FIG. 5 shows the percent recovery of various types of cells present in the interface of the sample after processing in colloidal silica prepared according to the method of the invention.

FIG. 5 shows the percent recovery of various types of cells present in the interface of the blood sample after processing on colloidal silica prepared according to the method of the invention. Briefly, PBMC were loaded into a centrifuge tube on the top of organosilanized colloidal silica having a density of 1.0605, pH 7.4, 280 mOsm and centrifuged as described in Example 2. Cells were recovered from the interface between the loading material and the density gradient material and analyzed for cell type, using staining and FACS analytical procedures, as detailed in Example 4. As shown in FIG. 5, $CD34^+$ cells and $CD14^+$ cells were the predominant forms of cells isolated, as expected under the conditions used.

Figure 6:
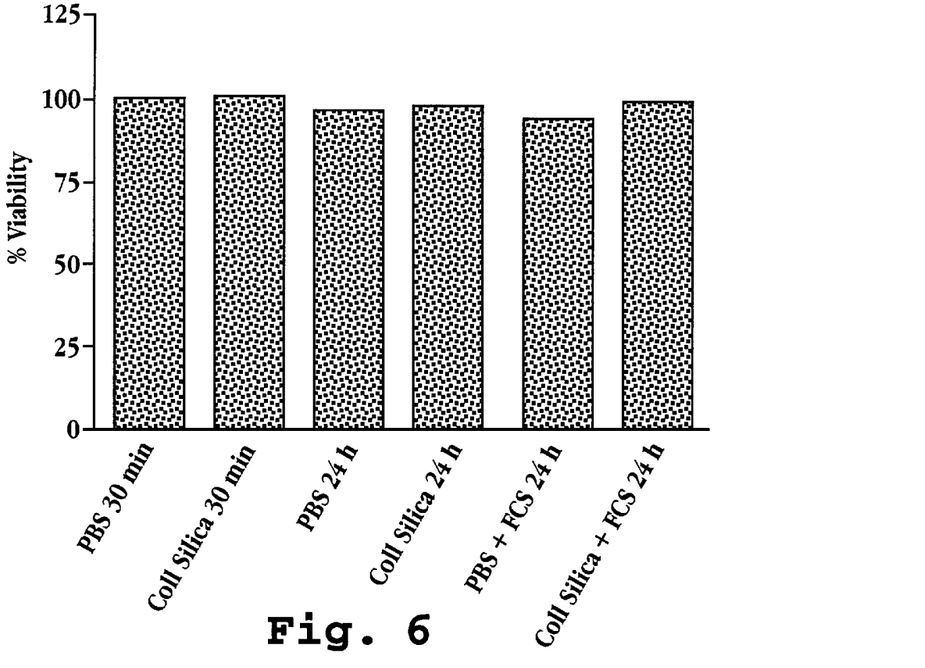
FIG. 6 shows the percent viability of cells incubated in the presence or absence of colloidal silica prepared according to the method of the invention (Example 3)

Further experiments showed that hematopoietic progenitor cells are viable, even when incubated with the organosilanized colloidal silica for 24 hours. FIG. 6 shows the results of experiments in which $CD34^+$ cells were incubated with buffer (PBS), colloidal silica (cs), or fetal calf serum (FCS) for 30 minutes and 24 hours, then tested for viability. As shown, cells incubated with colloidal silica were as viable as were cells incubated with buffer or fetal calf serum.

Figure 7:
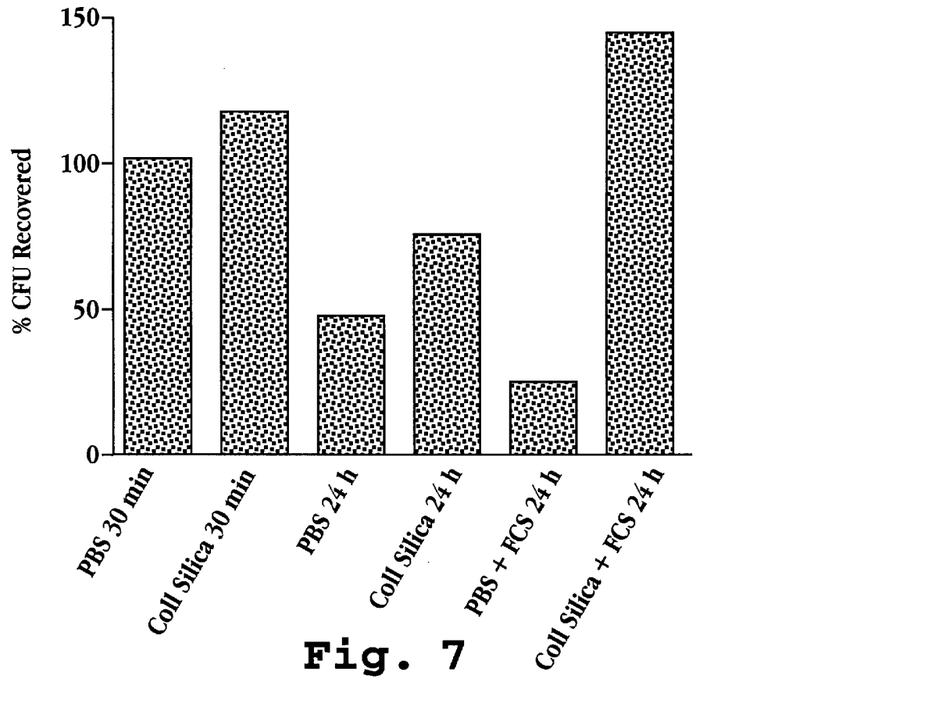
FIG. 7 shows the percent recovery of cells (colony forming units; CFU) prepared under different conditions (Example 3).

In further studies, detailed in Example 3, functional viability of various cell types was measured after exposure to PBS or colloidal silica for 30 min., PBS or colloidal silica for 30 minutes followed by cell growth medium (Iscove's buffer+serum) for 24 hours, or PBS or colloidal silica in the presence of serum for 24 hours. As shown in FIG. 7 functional viability (biological, proliferative and differentiation potential) was assessed by a colony forming assay, as described in Example 5. The data show that even under the most stringent incubation conditions, colony forming characteristics were unchanged for the $CD34^+$ cells.

In vivo toxicological tests carried out in support of the present invention in mammalian species also indicated that the product is apparently non-toxic when administered intravenously or intracutaneously. As such the product has the additional advantage that it may be suitable for use in separation and preparation of cells for introduction into mammalian species, such as in stem cell transplantation.

The invention also provides an environmentally safe method of preparing the colloidal silica material, since it is carried out using aqueous, relatively non-toxic preparation materials.

The following examples illustrate, but in no way are intended to limit the present invention.

Materials

A. Preparation of Peripheral Blood Progenitor Cells

Peripheral blood mononuclear cells (PBMC) collected by apheresis from non-Hodgkins lymphoma (NHL), Hodgkins lymphoma (HL) and breast cancer patients were obtained from the Bone Marrow Transplantation Laboratory at the Stanford University School of Medicine, Palo Alto, Calif., USA. PMBC were mobilized in NHL patients by treatment with cyctophosphamide (4 $g/m^2$, intravenously) followed by G-CSF (10 μg/kg, intravenously, daily). PBMC were mobilized in breast cancer patients by treatment with VP-16 (2 $g/m^2$, intravenously) followed by G-CSF (10 μg/kg, intravenously, daily). PBMC were mobilized in HL patients by treatment with G-CSF alone.

B. Antibodies

Monoclonal antibodies (mAb) directed against surface antigens specific for hematopoietic progenitor cells (CD34, anti-HPCA-2) and leukocytes (CD45, anti-HLe-1) were obtained from Becton Dickinson, Inc. (San Jose, Calif.). The different mAb's were directly labeled with fluorescein isothiocyanate (FITC) or phycoerythrin (PE), according to standard methods (Ausubel, et al., 1993). PE labeled isotype control IgG1 polyclonal antibodies were obtained from Becton-Dickinson, Inc. (San Jose, Calif.).

The following examples illustrate, but in no way are intended to limit the present invention.

EXAMPLE 1

Preparation of Silanized Colloidal Silica

γ-glycidoxypropyltrimethoxysilane (GPMS; United Chemicals, Bristol, Pa.) was added to water to form a solution having a final concentration of 10%. The pH was lowered to 2.5 with 1 N HCl, with continuous stirring. The solution was heated to 80 degrees C. for 60 minutes, then cooled to room temperature. Colloidal silica (Ludox HS-40, DuPont Chemicals, Wilmington, Del.) was gradually added to the aqueous silane solution while stirring continuously until the total concentration of silane was 7% vol/vol. The pH of the silane silica mixture was adjusted to 6.2 to 6.5, and the solution was stirred at room temperature for 15 minutes. The solution was then heated to 80° C. for 60 minutes, and subsequently at 95 degrees for 3 h. The solution was cooled to room temp. and the pH was increased to pH 9–10 with 1N NaOH. The silanized colloidal silica preparation was passed through an activated carbon column to remove reaction byproducts.

EXAMPLE 2

Density Gradient Centrifugation

PBMC were layered on the density gradient solution using a pipette. The layering was performed slowly to avoid mixing of the sample with the solution. A maximum of $2 \times 10^9$ cells was layered per tube. The centrifugation is performed for 30 min at 850 g at room temperature. To prevent mixing of the cells and the density gradient solution, the centrifuge was stopped without braking force. The cells were divided into a low density fraction located at the interface and a high density fraction which forms the pellet. Both cell fractions were collected using a pipette and poured into another 50 ml polypropylene centrifuge tube. The cells were washed once and stored in $Ca^{++}$ and $Mg^{++}$ free Dulbecco's D-PBS at room temperature until further manipulation. The number and functionality of the hematopoietic progenitor cells ($CD34^+$ cells) was determined in both cell fractions by FACS analysis and clonogenic assays as shown in FIGS. 5 and 7, respectively.

EXAMPLE 3

In Vitro Toxicology

The purpose of these experiments was to assess the effect of mixing and subsequent incubation of human peripheral blood in the density gradient solution. The objective of the study was to determine whether the density gradient solution exerts any effect on the viability and the functionality of human hematopoietic stem cells. Six different mixing and incubation paradigms were used in these experiments, as outlined below.

Specifically, $3 \times 10^7$ cells were suspended in 5 ml test buffer or density gradient solution in a 15 milliliter polypropylene centrifuge tube. The sample was then incubated for a defined period of time at room temperature, as indicated in Table 2 below. Cells were incubated for 30 minutes, 30 minutes followed by 24 hours in cell culture medium (Iscove's buffer+10% fetal calf serum), or 24 hours. Cells were collected and screened for ability to form hematopoietic colonies (CFU-E, BFU-E, CFU-GM and CFU-GEMM). Further assessment was made by measuring the volume of the PBMC sample, and placing half the volume into each of two 50 ml centrifuge tubes. Cell samples were then resuspended in a total of 50 ml volume using 1× D-PBS ($Ca^{++}$, $Mg^{++}$ free). One tube was centrifuged at 550 g for 10 minutes, and the supernatant was discarded. The pellet was resuspended up to the original volume ml using CD34 Enrichment Solution. Cells in each aliquot were then counted.

TABLE 2

| Condition | Buffer/Medium | Incubation |
|---|---|---|
| 1 | $Ca^{2+}$, $Mg^{2+}$-free D-PBS | 30 min, room temp. |
| 2 | Density Gradient Medium | 30 min, room temp. |
| 3 | $Ca^{2+}$, $Mg^{2+}$-free D-PBS | 30 min, room temp., pellet, resuspend in cell medium, then 24 h, room temp |
| 4 | Density Gradient Medium | 30 min, room temp., pellet, resuspend in cell medium then 24 h, room temp |
| 5 | $Ca^{2+}$, $Mg^{2+}$-free D-PBS + 10% Fetal Calf Serum | 24 hours, room temp. |
| 6 | Density Gradient Medium + 10% Fetal Calf Serum | 24 hours, room temp. |

EXAMPLE 4

Staining Procedure and Quantification of $CD34^+$ Cells by FACS Analysis

Quantitation of $CD34^+$ cells was performed by FACS analysis. The cells were labeled with a nuclear dye and mabs directed to CD34 and CD45. The percent CD34 cells was determined in the gate of nucleated cells. This approach was chosen to avoid the interference of unnucleated particulate material with the accuracy of CD34 cell analysis in the FACS.

A cell suspension of $2 \times 10^7$ cells/ml was made in $Ca^{++}$ and $Mg^{++}$ free D-PBS. 50 µl of this cell suspension was distributed in wells of 96 well microtiter plates, at a concentration of $1 \times 10^6$ cells per well. 50 µl of a 20% heat inactivated rabbit serum/D-PBS solution was then added to each well, followed by 10 µl of a 10 µg/ml LDS solution and 75 µl/D-PBS solution to each well. The contents of each well were mixed. The microtiter plate was covered with foil and incubated for 30 minutes at room temperature. To each control well was added 20 µl IgG1-phycoerythrin (IgG1-PE) and 20 µl CD34-PE, followed by mixing. The plate was recovered with foil and incubated for 15 minutes at 4° C. Plates were then centrifuged at 850 g for 2 minutes at 4° C. Plates were then flicked rapidly to remove supernatants, followed by resuspension of each cell pellet in 200 µl of cold (4° C.) 1× DPBS ($Ca^{++}$ and $Mg^{++}$ free). Plates were centrifuged at 850 g for 5 minutes at 4° C., then flicked rapidly to remove the supernatant. Each cell pellet was resuspended in 50 µl 20% heat inactivated rabbit serum solution. 20 µl CD45-FITC was added to each control and test well, followed by mixing. Plates were covered with foil and incubated for 30 minutes at 4° C. A 100 µl aliquot of cold (4° C.) 1× D-PBS ($Ca^{++}$ and $Mg^{++}$ free) was added to all control and test wells. Each plate was centrifuged at 850 g for 5 minutes at 4° C., followed by rapid flicking to remove supernatants. Cell pellets were resuspended in 100 µl cold (4° C.) 1× D-PBS ($Ca^{++}$ and $Mg^{++}$ free) followed by centrifugation at 850 g for 5 minutes at 4° C. Plates were then flicked rapidly to remove supernatant, and each cell pellet was resuspended in 200 µl 1% paraformaldehyde (4° C.). Plates were covered with foil and left at 4° C. until FACS analysis.

FACS analysis was performed on $10^4$ flow events using a FACSStar Plus system equipped with a LYSYS II program (Becton Dickinson, Inc.). A gate (Region 1) was placed around the nucleated cells determined by LDS 751 staining in FL3 in order to gate out the red cells, platelets and debris. FL1 and FL2 were displayed as a dot plot using Region 1. A gate (Region 2) was placed around the cell population that stains both with the anti-CD45 and anti-CD34 mAb's. The percentage of cells that stain with the anti-CD34 (FL2) and anti-CD45 (FL1) mAb's was determined in Region 2. This represents the percent CD34 positive coils in the total number of nucleated cells. The total number of CD34 positive cells was determined in the unprocessed sample and in the cell fraction obtained from the interface and pellet after processing of the PBMC samples on the density gradient solution.

EXAMPLE 5

Colony Forming (CFU) Assay

Cells were mixed at $10^5$ cells in 1 mL semi-solid methyl cellulose containing different colony stimulating factors and erythropoietin (MethoCult™ H4433 medium, Terry Fox Laboratories, Vancouver). After 14 days of culture at 37° C., the erythroid (CFU-E, BFU-E), granulocyte/macrophage (CFU-GM) and mixed (CFU-GEMM) colonies were counted under an inverted microscope (40×).

EXAMPLE 6

Statistical Analysis

The percent cell recovery was determined by the formula:

$$\% \text{ Recovery} = \frac{\text{Number of cells after manipulation}}{\text{Number of cells at start}} \times 100$$

The percent CD34 cell recovery was determined by the formula:

$$\% \text{ Recovery} = 100 \times \frac{\text{Number of CD34 cells after manipulation}}{\text{Number of CD34 cells at start}}$$

The percent clonogenic cell recovery was determined by the formula:

$$\% \text{ Recovery} = 100 \times \frac{\text{Number of clonogenic cells after manipulation}}{\text{Number of clonogenic cells at start}}$$

While the invention has been described with reference to specific methods and embodiments, it will be appreciated that various modifications and changes may be made without departing from the invention.

It is claimed:

1. A method of bulk preparation of a stable organosilanized colloidal silica suspension in an aqueous environment, comprising providing an aqueous organosilane solution having a pH in the range of about 2–3 and heated to about 80 degrees C. for about 1 hour, adding to said organosilane solution, a colloidal silica suspension to form an organosilane-colloidal silica mixture having a final concentration of between about 5 and about 10 organosilane;

adjusting the pH of said organosilane-colloidal silica mixture to a pH greater than about 6.0;

curing said suspension for a period of time effective to produce a stable colloidal suspension, as evidenced by lack of precipitate formation in the presence of physiological salt or acid, wherein said resulting stable colloidal silica suspension is aqueous and non-toxic to cells.

2. The method of claim 1, wherein said stability of said organosilanized silica suspension is evidenced by lack of precipitate formation in the presence of physiological salt or acid after repeated autoclaving or gamma-irradiation treatment.

3. The method of claim 1, wherein said organosilane has the formula: $(X)_3$—Si—$(CH_2)_3$—Y, wherein Y is selected from the group consisting of

—$O_2CCH_3$, —$N(CH_2CH_2OH)_2$, —$CO_2CH_3$, —$NH(CH_2)_2NH(CH_2)_2CO_2CH_3$, $NHCOCH_2NHC(CH_3)O$, and wherein X is selected from the group consisting of $H_3CO$, Cl, and $H_5C_2O$.

4. The method of claim 1 wherein said organosilane is gamma-glycidoxypropyltrimethoxysilane.

5. The method of claim 1, wherein said curing is accomplished by heating said suspension to at least about 80 degrees C. for at least one hour.

6. The method of claim 1, wherein said curing is accomplished by exposing said suspension to ultraviolet irradiation.

7. The method of claim 1, wherein said pH of said organosilane-colloidal silica mixture is adjusted to a pH in the range of 6.0 to 7.0.

8. The method of claim 7, wherein said pH is in the range of 6.2 to 6.5.

9. The method of claim 1, wherein silica particles comprising said colloidal silica suspension are characterized by a size range of about 3 to about 12 nm diameter.

10. The method of claim 9, wherein said silica particles are characterized by a size range of about 7 to 12 nm diameter.

* * * * *